United States Patent
Jackson

(10) Patent No.: US 7,527,664 B2
(45) Date of Patent: May 5, 2009

(54) INTEGRATED MACHINING MODULE FOR PROCESSING WORKPIECES AND A METHOD OF ASSEMBLING THE SAME

(75) Inventor: Mark Jackson, Brighton, MI (US)

(73) Assignee: Durr Ecoclean, Inc., Plymouth, MI (US)

( * ) Notice: Subject to any disclaimer, the term of this patent is extended or adjusted under 35 U.S.C. 154(b) by 681 days.

(21) Appl. No.: 11/145,732

(22) Filed: Jun. 6, 2005

(65) Prior Publication Data

US 2005/0274661 A1 Dec. 15, 2005

Related U.S. Application Data

(60) Provisional application No. 60/576,922, filed on Jun. 4, 2004.

(51) Int. Cl.
*C02F 1/40* (2006.01)
*B01L 1/04* (2006.01)

(52) U.S. Cl. ............... 55/385.2; 55/385.1; 55/DIG. 18; 55/DIG. 29; 454/187; 454/52; 454/57; 210/104; 210/171; 210/262; 210/300; 210/521; 210/DIG. 5

(58) Field of Classification Search ................ 55/385.2, 55/385.1, DIG. 18, DIG. 29; 454/187, 52, 454/57; 210/104, 171, 262, 300, 521, 540, 210/DIG. 5
See application file for complete search history.

(56) References Cited

U.S. PATENT DOCUMENTS

| | | | |
|---|---|---|---|
| 3,871,484 A | 3/1975 | Thomas | |
| 4,264,240 A * | 4/1981 | Alexander | 406/85 |
| 4,655,940 A | 4/1987 | Harms | |
| 4,723,505 A * | 2/1988 | Wilson et al. | 118/326 |
| 5,300,220 A | 4/1994 | McEwen | |
| 5,417,849 A | 5/1995 | McEwen et al. | |
| 5,425,793 A * | 6/1995 | Mori et al. | 55/385.2 |
| 5,454,937 A * | 10/1995 | Lewandowski | 210/104 |
| 5,466,380 A | 11/1995 | Bratten | |
| 5,662,812 A | 9/1997 | McEwen | |
| 5,980,735 A | 11/1999 | Bratten | |
| 6,364,762 B1 * | 4/2002 | Kaveh et al. | 454/187 |
| 6,390,383 B1 | 5/2002 | Fusaro, Jr. et al. | |
| 6,508,944 B1 | 1/2003 | Bratten | |
| 6,612,314 B2 | 9/2003 | Bratten | |
| 6,758,875 B2 * | 7/2004 | Reid et al. | 55/385.2 |
| 7,014,672 B2 * | 3/2006 | Ishihara et al. | 55/356 |

* cited by examiner

*Primary Examiner*—Duane S Smith
*Assistant Examiner*—Minh-Chau T Pham
(74) *Attorney, Agent, or Firm*—Howard & Howard Attorneys PLLC

(57) ABSTRACT

A system for machining workpieces (12) and separating the chips from the workpieces (12) includes a plurality of workstations (14) detachably interconnected by a housing (16) and arranged along a processing path (A). A coolant and filtration device (56) extends through the workstations (14) and is adaptable for separating the chips from the workpieces (12). A mist collection device (54) is cooperable with the workstations (14) and the coolant and filtration device (56) for removing mist generated by the workstations (14) while machining the workpieces (12). The workstations (14) are interconnected with the mist collection device (54) and the coolant and filtration device (56) to form a single machining module (10) of various dimensions and configurations to be adaptable for various manufacturing environments.

61 Claims, 10 Drawing Sheets

INTEGRATED MACHINING MODULE FOR PROCESSING WORKPIECES AND A METHOD OF ASSEMBLING THE SAME

RELATED APPLICATIONS

This non-provisional patent application claims the benefit of the provisional patent application Ser. No. 60/576,922 for a FLEXIBLE MACHINING MODULE, filed on Jun. 4, 2004, which is hereby incorporated by reference.

BACKGROUND OF THE INVENTION

1. Field of the Invention

The subject invention relates to an automated machine tool for machining workpieces.

2. Description of the Prior Art

With advent of a modern technology machining operations play important role in manufacturing various parts, such as, for example, a housing for an automotive axle device, cylinder heads, crankcases or transmission housings. Each machining tool involves a lathe tool that generates circular sections by rotating the workpiece, so that a cutting tool can peel metal off, creating a smooth, round surface of the workpiece. A drill or punch press is used to remove metal in the shape of a hole. Other tools are used for various types of metal removal operations such as, for example, milling machines, saws, and grinding tools. The aforementioned tools used in the advanced machining operations are incorporated in a typical machining cell.

Often an unfinished workpiece needs to have some parts removed or scraped away in order to create a finished product, on transfer lines or in the machining cell. During the machining of the workpieces, where chips are removed from the workpiece, very large amounts of liquid coolant are required to cool the workpiece and the machining tool, to lubricate the machining tool and to take away the chips removed from the workpiece during the machining. Each machining tool is supplied coolant from a centralized filtration system, or a stand alone filtration system. The centralized filtration system requires a pipe to be supplied to and from the centralized filtration system to each machine tool. The contaminated coolant which carries machining chips, extracted from the workpieces being machined, back to the centralized filtration system is performed by a pump, as known to those skilled in the art.

Typically, each machining tool also includes a mist collection system to collect mist generated by the coolant. The mist collection system is sized for a certain amount of air extraction from each machine tool. Mist collectors are generally mounted in its own sound enclosure requiring an individual power supply, control panel as well as a coolant containment system.

Typical methods of loading machining tools with an automation system include specific pick and place style loaders, robot loaders, such as, for example, Gantry loaders. The automation used to place the pre-machined workpiece to the machining tool and to remove the machined workpiece from the machining tool vary in design type and style, depending on the workpiece being transported and machined, and the customer specific requirements. The machining tools equipped with the Gantry loaders are required to be installed in-line, to a very tight tolerance, as the Gantry loader loads each machining tool along a common center-line. With this practice, each operation of automation contains its own electrical and pneumatic control power, which requires additional floor space. Alluding to the above, the aforementioned mist collection system, central filtration system, and the automation system require additional floor space, manpower and extra time for assembly and installation the same to perform machining operations.

The art is replete with various systems and methods, which involve machining tools having a system for cooling, lubricating, and flushing chips and abrading grit away from the workpiece machined. Some of the aforementioned systems are taught by the U.S. Pat. No. 5,417,849 to McEwen et al.; U.S. Pat. No. 5,466,380 to Bratten; and U.S. Pat. No. 5,980,735 to Bratten.

The U.S. Pat. No. 5,980,735 to Bratten, for example, teaches a collection system for collecting coolant and chips from a series of machining tools and for cleaning the coolant in a filter system and re-circulating the coolant back to the machining tools. The machining tools are supported above and are connected to a floor by bases or supports. A series of connected trough sections extend beneath coolant collectors of the machining tools so as to be positioned to collectively receive all of the coolant from the machining tools. The collection system taught by the U.S. Pat. No. 5,980,735 to Bratten has to be re-configured and moved to adapt to various machining tools stationary located at manufacturing plants, which requires a significant amount of time and mass of redundant operations. The collection system and the machining tool are not interconnected to be relocatable between different locations, e.i. manufacturing plants.

Other prior art machining systems tried to solve the problem by delivering the mist collection system, the centralized filtration system, the workstations separately one from the other and assembling the same at the manufacturing plant. Although the prior machining systems are widely used in various industries today, these prior art designs have proven to be extremely complicated, and therefore non practicable, or have been non-flexible for the manufacturing environment. In addition, these prior art machining systems require at least ten or fifteen persons and up to six and seven weeks of installation time to prepare the system for machining operations.

The opportunity remains for a new design of the machining systems that will eliminate the need of extra units and offer the flexibility needed to process various workpieces in modern manufacturing environments.

BRIEF SUMMARY OF INVENTION

A system for machining workpieces, such as, for example, a housing for an automotive axle device, cylinder heads, crankcases or transmission housings, and separating the chips generated from machining the workpieces includes a plurality of machining tools, i.e. workstations, detachably interconnected and arranged along a processing path for machining the workpieces. A coolant and filtration device extends through the machining tools and is adaptable for circulating the chips from the workpieces. A mist collection device is cooperable with the machining tools and the coolant and filtration device to remove the mist generated by the machining tools while machining the workpieces and to discharge the mist into the mist collection device. The machining tools are interconnected with the mist collection device and the coolant and filtration device by a housing to form a single machining module. A manipulator, such as, for example, a multi-axial robot, is disposed at the single machining module. The manipulator is movable along the processing path for processing the workpieces at each of the machining tools. The single machining module of the present invention is adaptable to be installed in various manufacturing environments and is movable between various remote locations for processing the workpieces.

A method of forming the single machining module of the present invention includes the step of detachably interconnecting the workstations for machining the workpieces and to form the single machining module. The next step of the method includes assembling the mist collection device and the coolant and filtration device with the machining tools to form the single machining module to circulate the chips from the workpieces and to remove the mist generated by the workstations. The method includes the step of connecting the manipulator to the single machining module to move the workpieces along the processing path to process the workpieces at each of the workstations. The method includes the step of moving the single machining module to the remote location.

An advantage of the present invention is to provide an improved inventive machining module over traditional installation methods and systems are numerous, wherein the inventive machining module is assembled at the remote location and delivered to a customer, such as, for example, a manufacturing plant less than forty eight hours.

An advantage of the present invention is to provide an improved inventive machining module that reduces manpower requirements for installation of a complete integrated machine cell from ten persons or more to three persons maximum.

Another advantage of the present invention is to provide an integrated machining system that reduced installation time and reduced manpower required for installation of an inventive machining module.

Another advantage of the present invention is to provide a system that performs multiple processes, such as for example, a mist collection, a centralized filtration system, and an automated robotic device for loading and unloading operations, to support the inventive machining module requirements as combined into one single module.

Still another advantage of the present invention is to provide a flexible and re-configurable single machining module adaptable to be flexibly installed at almost any manufacturing floor plan.

Still another advantage of the present invention is to provide a single machining module that is integrated into existing buildings.

Still another advantage of the present invention is to provide a single machining module capable of being re-tooled for future changes, allowing it to handle a wide range of the workpieces at multiple cycle times.

Still another advantage of the present invention is to provide for an improved design of a single machining module that is not extremely complicated, like prior art designs, and is quite practicable, particularly when processing a variety of workpieces at different remote locations.

Accordingly, the single machining module, shown in the present invention is new, efficient, and provides for an effective way for assembling and relocating the single machining module between various remote locations thereby offering the flexibility needed in modern manufacturing environments.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
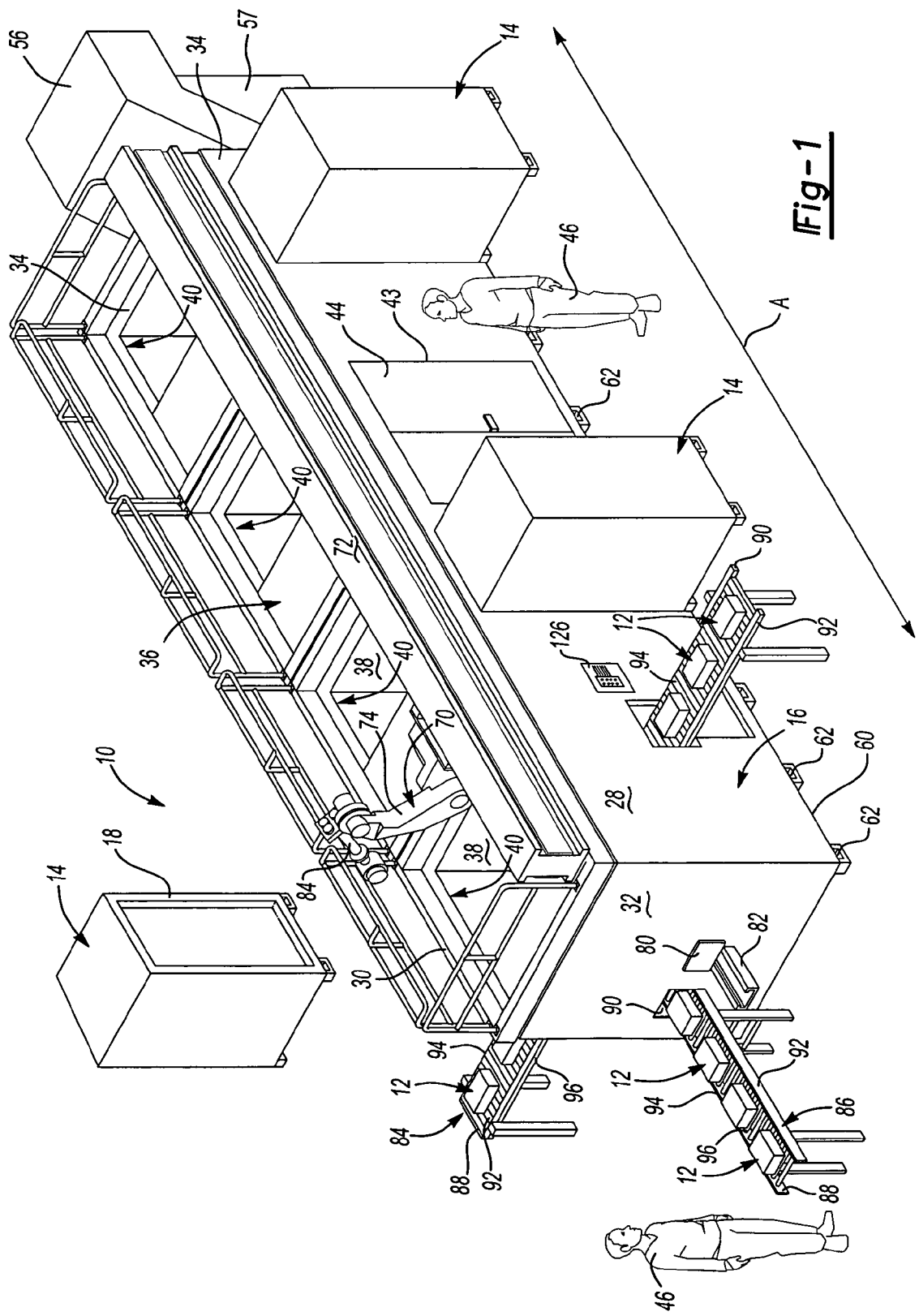
FIG. 1 shows a perspective view of an inventive machining module.

Referring to FIG. 1, an integrated machining module (the module) of the present invention, generally shown at 10, and is designed for machining workpieces, generally indicated at 12. Generally, the workpiece 12 is an iron cast or an injection molded and includes a housing for an automotive axle device, cylinder heads, crankcases or transmission housings, an engine block, and the like. The module 10 is adaptable to process an unfinished workpiece 12 which requires machining in order to create a finished product. The module 10 is used for various types of metal removal operations such as, for example grinding, drilling, milling, turning, sawing, thread cutting and the like required for finishing the workpiece 12.

Figure 4:
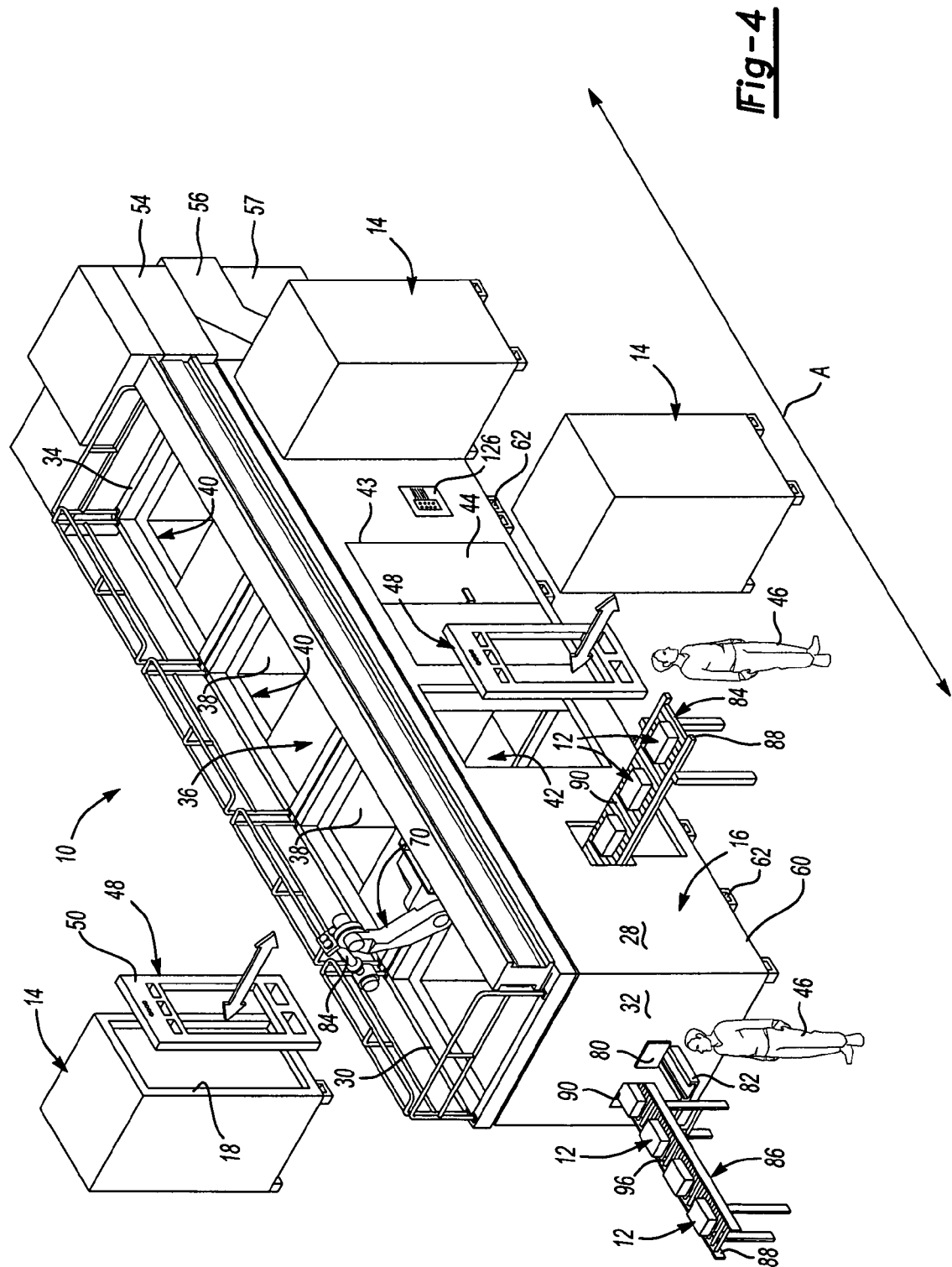
FIG. 4 shows a perspective view of FIG. 1 with several workstations being detached from the inventive machining module.

The module 10 interfaces with a plurality machining tools, i.e. workstations, generally indicated at 14, detachably interconnected to a housing 16 as will be discussed in greater detail as the description of the module 10 proceeds. A tool (not shown) is disposed in each of the workstations 14 to perform the aforementioned multiple machining operations. Each workstation 14 includes an operational interface 18 defined at the front of each workstation 14. The operational interface 18 is further defined by male and/or female connectors (not shown), respectively, such as, for example, fluid and power transmitting connectors to supply fluid and power for facilitating operational mode of the workstation 14. Based on a particular manufacturer of the workstation 14, the configuration or design of the operational interface 18 may vary. The workstations 14 are arranged along a processing path A, as illustrated in FIG. 1 or 4, for machining the workpieces 12 of different configurations.

Figure 2:
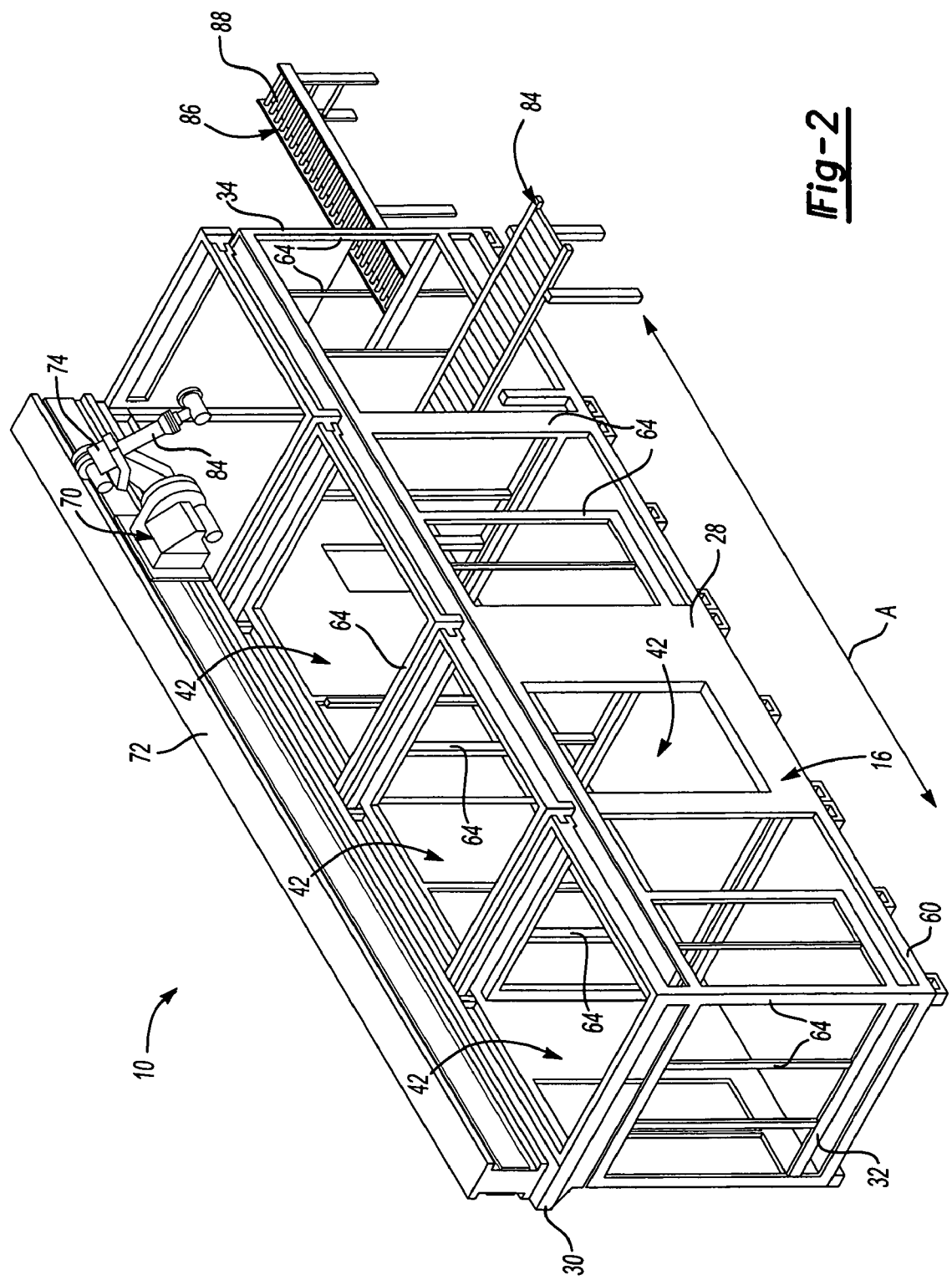
FIG. 2 shows a transparent and perspective view of the inventive machining module without side panels.
Figure 3:
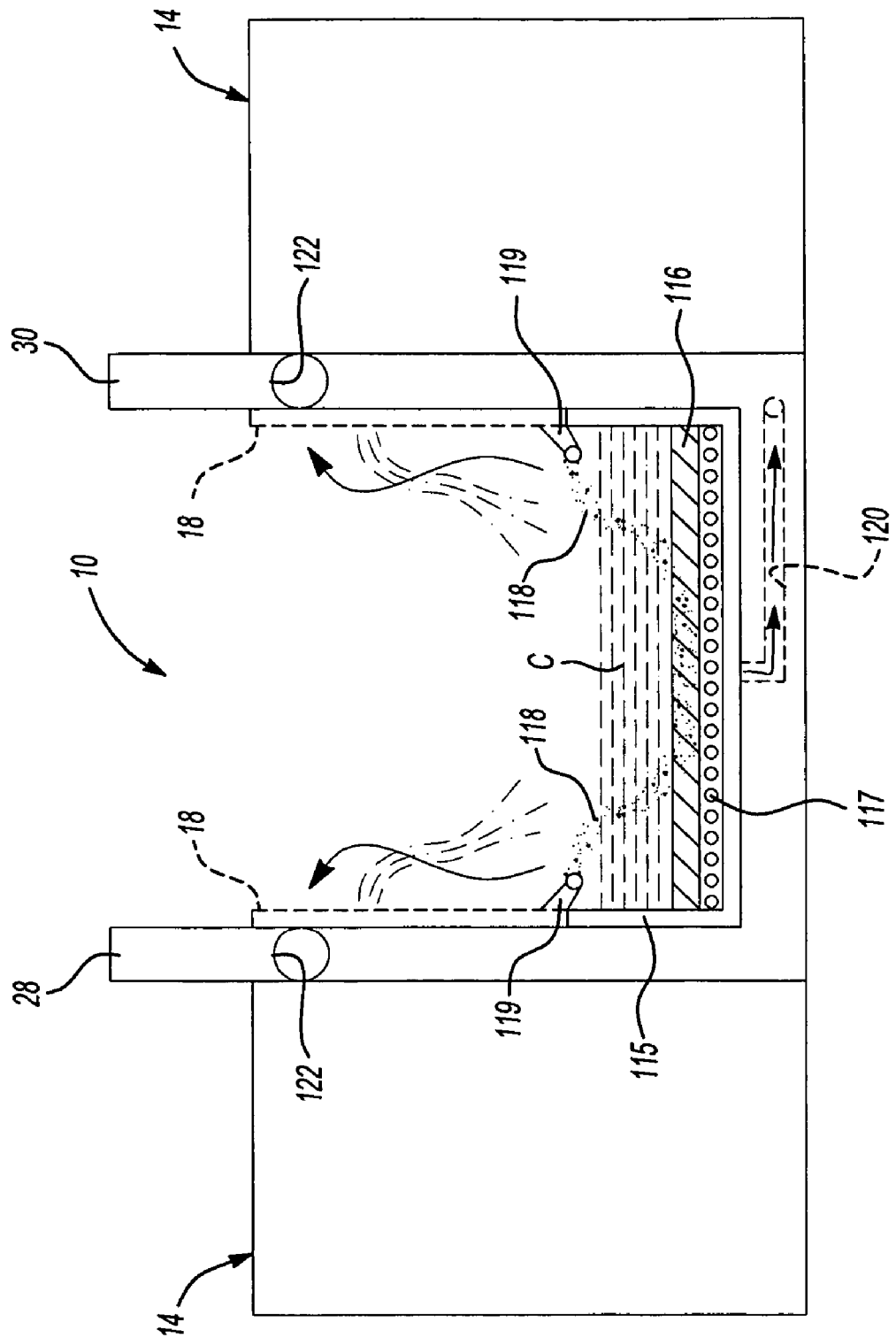
FIG. 3 shows a schematic end view of the inventive machining module of FIG. 1.

As illustrated in FIGS. 2 and 3, the housing 16 includes side walls or panels 28, 30 interconnected with end walls or panels 32, 34 and exposing to an open top, generally indicated at 36. A plurality of separators or dividing walls 38 are optionally disposed in the housing 16 interconnecting the side walls 28, 30 and extending parallel to the end walls 32, 34. The separators 38 divide the housing 16 to machining cells, generally indicated at 40, wherein the workstations 14 are exposed. A plurality of openings, generally indicated at 42, are defined in each side walls 28, 30 corresponding to the number of the workstations 14 associated with the module 10. Obviously, only a single opening 42 would be necessary for a module 10 having only a single workstation 14. Several of the openings, such as access openings, shown at 43 in FIGS. 1 and 4, are preferably enclosed by a door 44 to provide access for an operator 46 to service the workstations 14, which, as set forth above, are detachably and interchangeably disposed in the openings 42.

Figure 5:
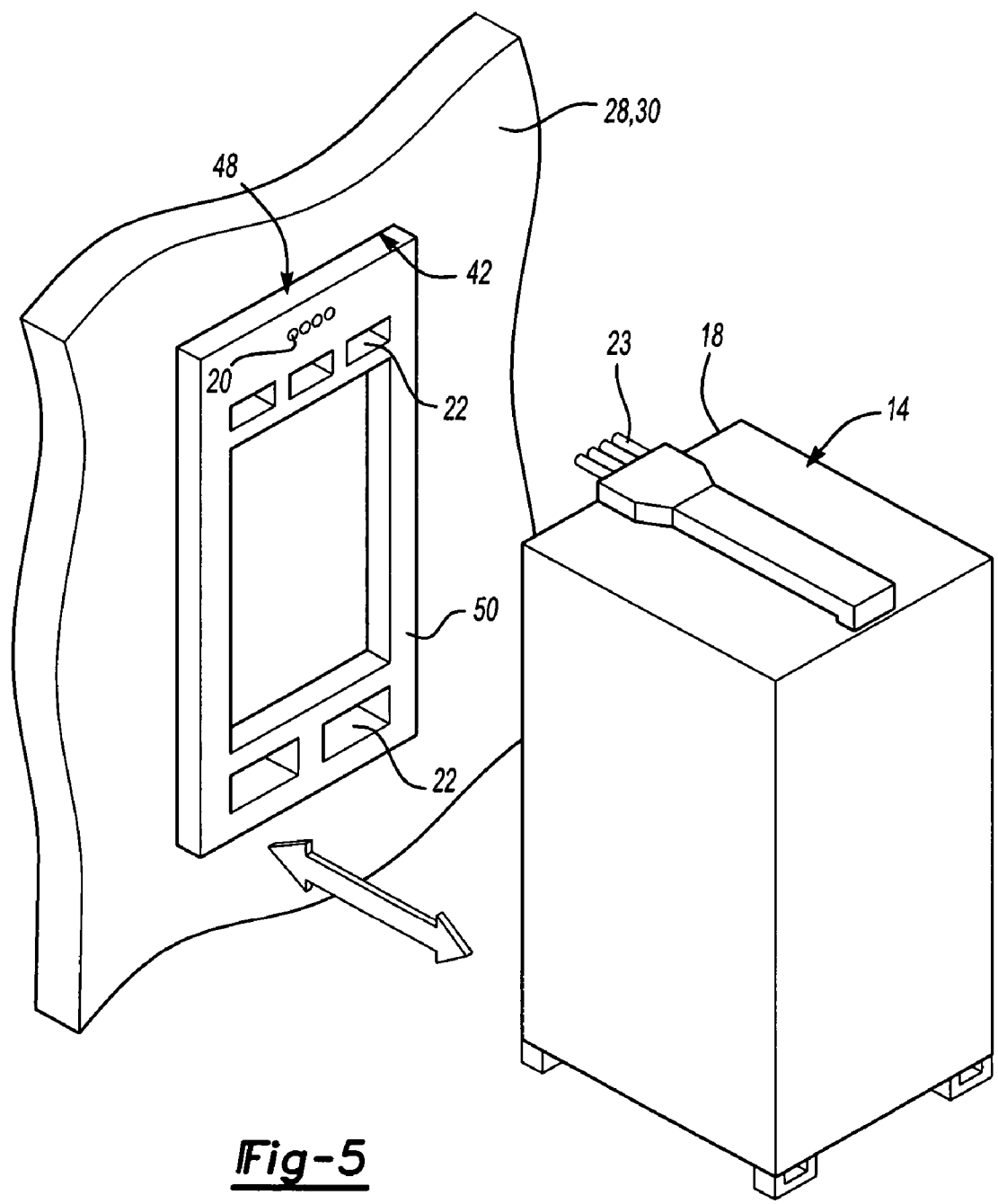
FIG. 5 shows a fragmental and exploded view of the workstation and an interface panel of the workstation.

As best shown in FIG. 5, an interface connection, generally indicated at 48, defined by a panel 50, is disposed in one of the openings 42 of the housing 16 to interchangeably receive the operational interfaces 18 of the workstation 14. The interface connection 48 defines a connection system, defined by male and/or female connectors 20, 22, configured to complement with the male and/or female connectors 23 of the operational interface 18 of the workstation 14. Preferably, the panel 50 is detachably disposed in one of the openings 42 to be re-attached in adjacent opening to relocate the workstation 14 relative to the module 10, if a particular application requires. Alternatively, the panel 50 is adaptably configured to accommodate the operational interface 18 of different designs. The end wall 34 defines an inlet (not shown) adaptable for receiving fluids, such as coolant, filtration liquid, air supply, at the manufacturing facility, necessary for operating a mist collection system 54, a coolant and filtrations system 56, and a centralized high pressure pump station 57, all best shown in FIGS. 1 and 4 and described in detail as description of the present invention proceeds.

Figure 7:
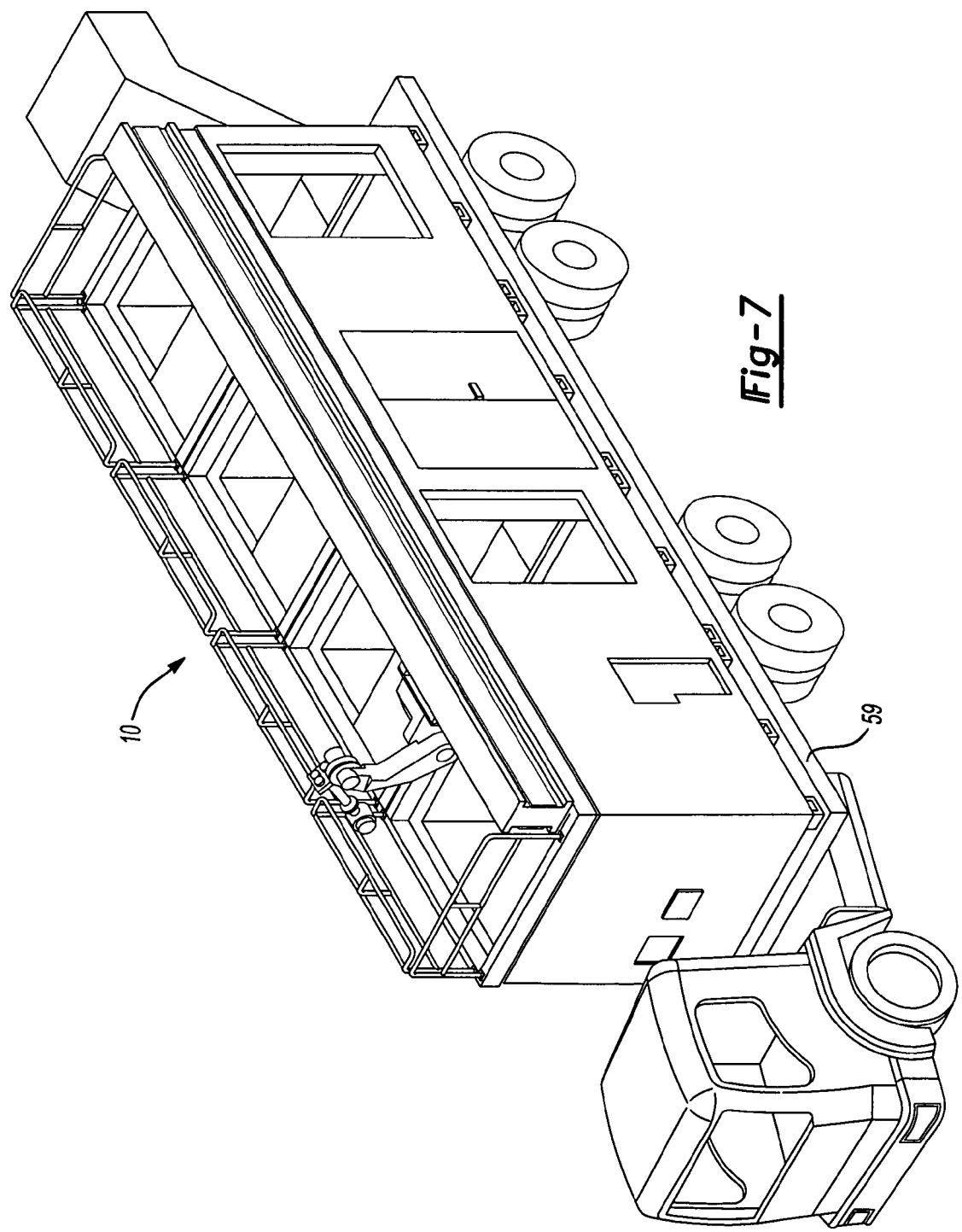
FIG. 7 shows the inventive machining module positioned on a bed of a truck for moving the inventive machining module to a remote location.

The coolant and filtration system 56 and the mist collection system 54 are integrated into the module 10 at a remote location, such as for example, an assembly facility. When the module 10 is completely assembled, i.e. integrated, the module 10 is placed on a bed of a truck 59, as illustrated in FIG. 7, and is moved to a manufacturing facility. When the module 10 is delivered to the manufacturing facility, the module 10 is unloaded from the truck 59, placed to a designated location and is ready to perform machining operations.

The housing 16 serves as both safety guarding feature and sound attenuation adaptable for maintaining at least 77 dba noise levels. A plurality of flanges (not shown) are disposed at the bottom periphery 60 of the housing 16 adaptable for connecting the single machining module 10 to a floor (not shown) by fasteners, or the like. Alternatively, a plurality of fork-lift sleeves 62 are attached to the housing 16 for receiving the forks of a fork-lift truck (not shown). Preferably, the housing 16 is lengthened or shortened by increasing or decreasing, respectively, by additional panels based on the number of the workstations 14 required for certain application thereby forming the aforementioned module 10 of various dimensions and configurations used for alternative manufacturing environments with different floor plans and to enable moving the module 10 between various remote locations for processing the workpieces 12. Preferably, the housing 16 is formed from reinforced beams 64 to provide rigid structure to the module 10 to enable assembling the module 10 at the aforementioned remote location and to transport the assembled module 10 to the manufacturing facility.

The module 10 includes a manipulator 70 to move the workpiece 12 between the workstations 14. The manipulator 70 is preferably disposed at the open top 36 of the module 10 upon a track 72 that is connected to one of the side walls 28 of the housing 16 at the open top 36 and is adaptable to engage a completely programmable multi-axial robotic device 74 movable along the track 72 and along the processing path A for engaging the workpiece 12. The robotic device 74 includes an identification unit (not shown) performing selected functions, such as gauge and reject functions to inspect finished machined workpiece 12 or pre-machined workpiece 12 and to identify defective workpiece 12. Alternatively, a gauge and reject station 80 is defined in the housing 16. The gauge and reject station 80 is accessible through a gauge conveyor 82 to allow the operator 46 to manually eliminate a defect found in the workpiece 12, where possible. A gripper 84 of the robotic device 74 grips the workpiece 12 and transports the workpiece 12 to each workstation 14 for a product exchange. The robotic device 74 transports "raw" or pre-machined workpieces 12 and "finished" or machined workpieces 12 to and from the incoming and outgoing automation, i.e. conveyor system.

The conveyor system includes a first conveyor, generally indicated at 84. The first conveyor 84 extends transversely through the side walls 28, 30 of the housing 16 partially encapsulating the module 10 for delivering pre-machined workpiece 12 to be pick-up by the multi-axial robotic device 74 and moving the machined workpiece 12 away from the multi-axial robotic device 74 after machining process is complete. A second conveyor, generally indicated at 86, extends from the end wall 32 of the housing 16 to the module 10 for removing defective workpiece 12 from the module 10 for further processing. Each first 84 and second 86 conveyors include terminal ends 88, 90 and side walls 92, 94.

As best shown in FIG. 1, each first 84 and second 86 conveyor includes a plurality of rollers 96 rotatable about the axis. The rollers 96 support the workpiece 12 movable along the processing path A. The rollers 96 and respective motors (not shown) are operably associated with respect to one another by appropriate gearing, sprockets and chains, or pulleys and belts (all not shown). Those skilled in the mechanical art will appreciate that other mechanical engagements are used to associate each of the motors with the respective rollers 96. Those skilled in the mechanical art will appreciate that other conveyance devices may also be used for moving the workpiece 12 through the module 10.

Figure 6:
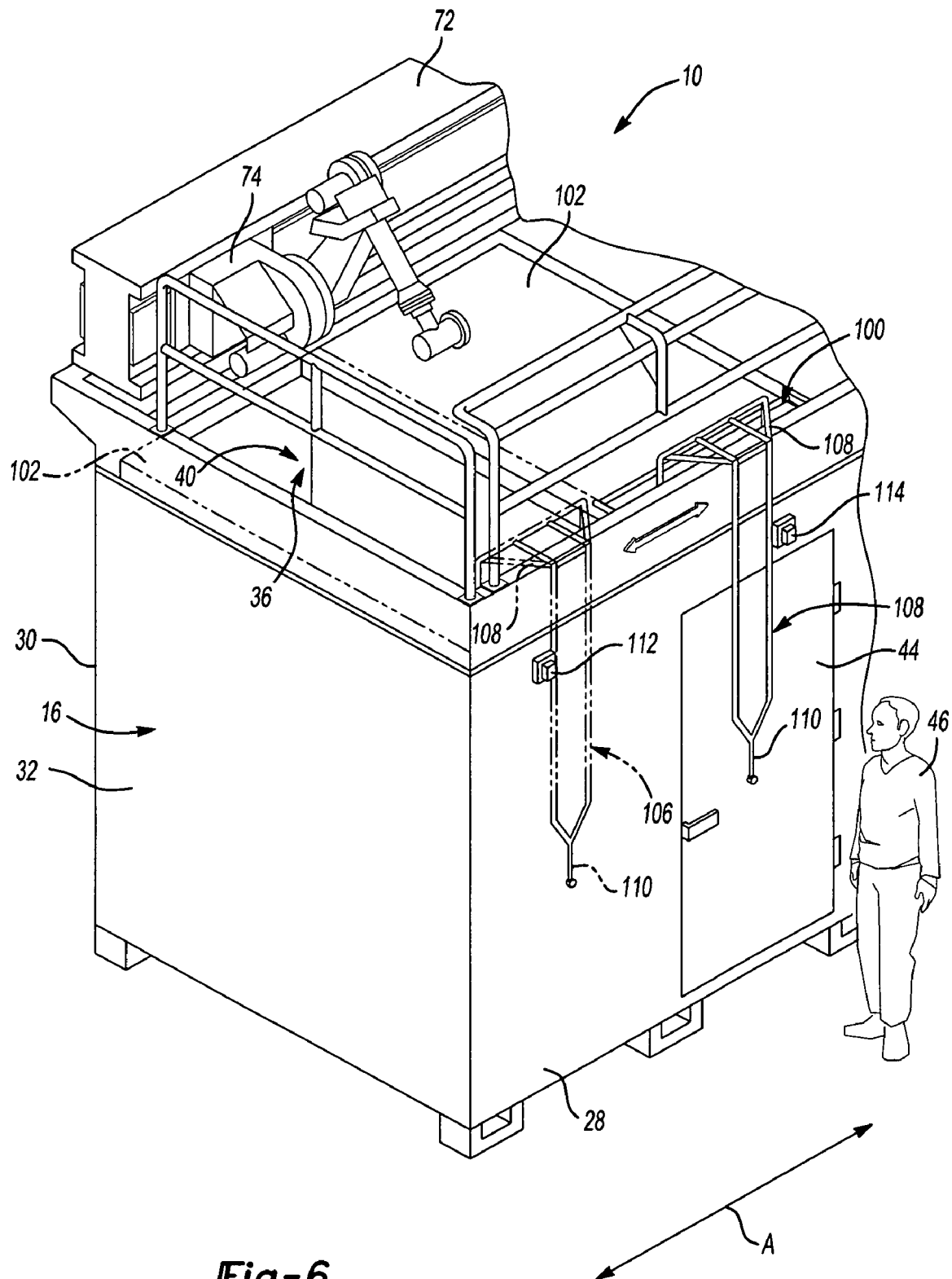
FIG. 6 shows a perspective and fragmental view of the machining module illustrating a locking mechanism to prevent a robotic arm from accessing the workstation as an operator performs maintenance of the workstation.

A safety device prevents the robotic device 74 from accessing the workstation 14 when the operator 46 is inside the housing 16 to perform maintenance of the workstation 14. The safety device is defined by a locking mechanism, generally shown at 100 in FIG. 6. The locking mechanism 100 includes a roof panel 102 formed from an impact resistant material, such as, for example, a reinforced metal sheet panel, or the like. The roof panel 102 is slidable relative to the housing 16 at the open top 36. The locking mechanism 100 is further defined by a channel (not shown) formed in the housing 16 at the open top 36. A handle is generally indicated at 106 and is disposed in the channel. The handle 106 is interconnected with the roof panel 102 and is slidably movable along the processing path A with the roof panel 102 between "lock-in" position, wherein the handle 106 overlaps the door 44 and prevents the operator 46 from opening the door 44 to enter the housing 16 while the robotic device 74 places the workpiece 12 into the workstation 14, and "lock-out" position, wherein the handle 106 is moved away from the door 44 thereby preventing the robotic device 74 from accessing the housing 16 thereby protecting the operator 46. The handle 106 is further defined by a shoulder 108 partially disposed in and movable along the processing path A. The shoulder 108 extends to a gripper 110 that overlaps the door 44 when closed and prevents the door 44 from being opened. The locking mechanism 100 is further defined by a pair of limiters 112, 114 connected to the housing 16 for controlling slidable movement of the handle 106 relative to the housing 16.

Alternatively, the locking mechanism 100 includes a sensor (not shown) operatively communicated with the door 44 and an actuator (not shown), such as, for example, an electric motor connected to the roof panel 102 for moving the roof panel 102 between the aforementioned "lock-in" and "lock-out" positions. When the operator 46 opens the door 44, the sensor sends a signal to the actuator thereby moving the roof panel 102 into a safety position to prevent the robotic device 74 from accessing the housing 16 thereby protecting the operator 46. Those skilled in the mechanical and electrical art will appreciate that other devices may be used to move the roof panel 102 to the safety position as the door 44 opens.

As best illustrated in FIG. 3, the coolant and filtration system 56 includes a plurality of coolant filter tanks 115 disposed in the housing 16. A continuous filtration valve 116 is rotatably disposed relative a conveyance mechanism 117 disposed in the coolant filter tanks 115. Each filter tank 115 is designated for receiving coolant C carrying a different material contaminant, such as, for example, machining chips 118 from the machined workpieces 12. A fluid control communication system (not shown) controls the communication of the coolant C from the workstations 14 to the coolant filter tanks 115 through a hopper 119. A liquid level sensor (not shown) senses the level of the coolant C within the respective tank 115. The coolant coolant C is sucked through the filtration valve 116 and the conveyance mechanism 117 into a piping system 120 fluidly communicated with the centralized high pressure pump station 57 for circulating the coolant C separated from the machining chips 118 back to the workstations 14.

The mist collection system 54 supplied in the module 10 is exposed to the workstations 14 through mist receiving ducts 122 extending through each side wall 28, 30. The mist collection system 54 removes all mist generated by the workstations 14 during their machine cycle. The mist collected by the module 10 is condensed and discharged into the coolant and filtration system 56 for reuse.

The module 10 includes additional components, such as, for example, a dunnage automation system 124 for pack-in or pack-out options. The module 10 includes other additional components that are not shown in the present invention. These components, such as, for example, a workpiece marking or a workpiece reading station, buffering racks, de-burring cells, washing modules, assembly modules, testing modules for conducting a leak test, pressure test, and the like, are integrated into the module 10 as required for certain machining application, and are not intended to limit the present invention. All electrical and pneumatic controls and control panels 126 are integrally incorporated in the module 10. The completely interconnected workstations 14 allow for interlock signals to be passed to and from each machining tool, for complete automated function.

Preferably, a controller (not shown) is also integrated in the module 10 and is operatively connected with each of the workstations 14. The controller includes a controller device, i.e. computer, operably and electronically communicated with the identification unit of the robotic device 74. The computer has an input/output interface, a central processor unit, a random access memory, i.e. RAM, and a read only memory, i.e. ROM. The input interface is electrically connected with the robotic device 74 and the identification unit. The controller is pre-programmed with the various sizes, types of the workpiece 12 to be machined. The ROM stores a program, i.e. a comparative software that determines proper order of machining operations and steps. The controller compares the image received from the identification unit with a plurality of images stored in memory and identifies the workpiece 12 to be machined. Each of the images stored in memory is associated with structural characteristics and physical dimensions of the workpiece 12. If the workpiece 12 is defective, the control system sends an electronic signal to the robotic device 74 thereby directing the robotic device 74 to place the defective workpieces 12 onto the second conveyor 86.

Figure 8:
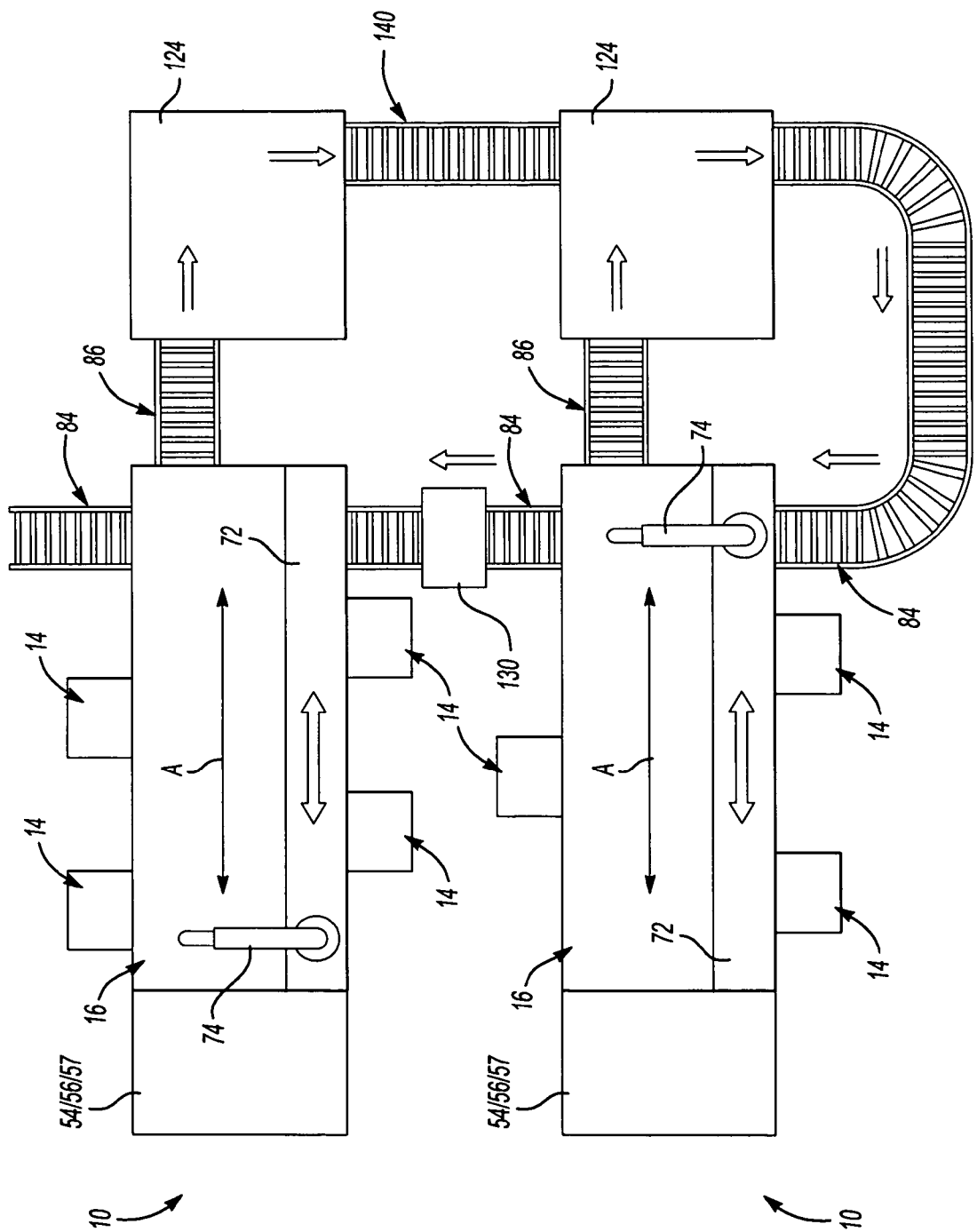
FIG. 8 shows a plan view of two machining modules and a pair of dunnage stations integrated into a single machining application.

As illustrated in FIG. 8, two machining modules 10 are combined in a single application, wherein the first conveyors 84 of each module 10 are interconnected by a link 130 to transfer the workpieces 12 therebetween. Each module 10 includes the dunnage unit with the second conveyors 86 of each machining module 10 extending to the respective dunnage system 122 for transferring the defective workpieces 12 for eliminating structural defects of the workpiece 12 that can not be eliminated manually. The dunnage systems 124 are interconnected with the first conveyor 84 of the machining module 10 to form a continuous loop, generally indicated at 140, of machining application to return defective workpieces 12 to the workstations 14 when feasible.

Figure 9:
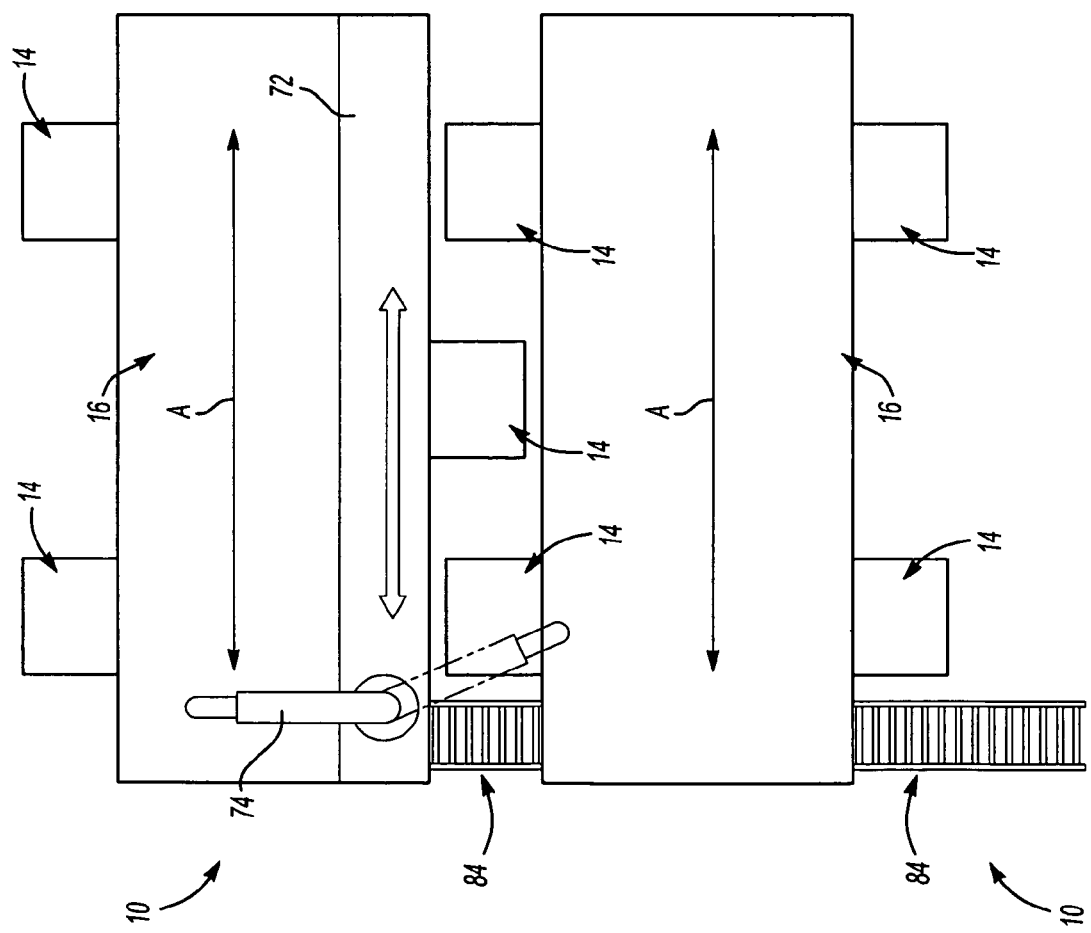
FIG. 9 shows another plan view of two adjacent machining modules wherein one of the machining modules has a robotic manipulator adaptable to service both machining modules in a single machining application.

FIG. 9 illustrates another alternative embodiment of the present invention wherein two machining modules 10 are adjacently positioned relative to one another on a manufacturing floor. The first conveyors 84 of each machining module 10 are interconnected. Preferably, one of the machining modules 10 includes the multi-axial robotic device 74 slidably movable along the processing path A. The robotic device 74 is adaptable to move the workpieces 12 between and relative to both adjacently positioned machining modules 10 thereby improving flexibility of the machining applications.

Figure 10:
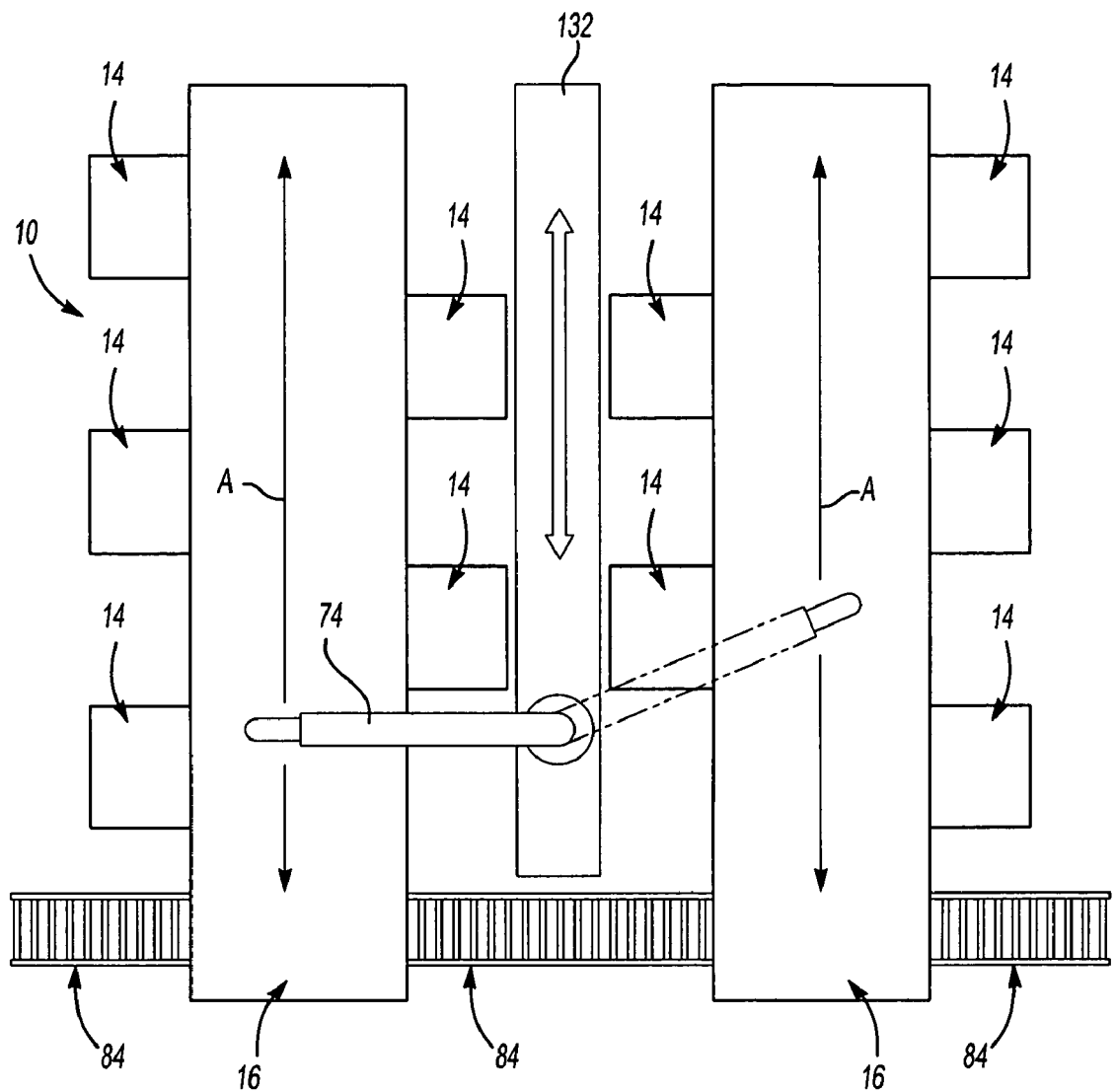
FIG. 10 shows still another plan view of two adjacent machining modules and a robotic manipulator positioned therebetween and movable along the adjacent machining modules to service both machining modules in a single machining application.

FIG. 10 illustrates still another embodiment of the present invention wherein two machining modules 10 are adjacently positioned relative to one another on the manufacturing floor. The first conveyors 84 of each machining modules 10 are interconnected. The multi-axial robotic device 74 is slidably movable along a floor mounted track 132 mounted to the manufacturing floor between the two machining modules 10 and is movable along the processing path A to selectively and interchangeably move the workpieces 12 between and relative to both adjacently positioned machining modules 10 thereby improving flexibility of the machining applications. The embodiments of the present invention, as illustrated in FIGS. 8 through 10, includes the workstations 14 designed to perform various operations to facilitate progressive machining operation.

The module 10 of the present invention has several advantages over prior art designs. One of the major advantages of the present invention over the prior art is to provide an improved design of the module 10 that allows the module 10 to be assembled at the remote location and delivered to a customer, such as, for example, a manufacturing plant under forty eight hours thereby reducing manpower requirements for installation of a complete integrated machine cell, i.e. the module 10, from ten persons or more to three persons maximum. Other advantage of the module 10 provides for combined multiple processes, such as for example, a mist collection, a centralized filtration, and a robotic automation for loading and unloading operations, to support the inventive machining module 10 requirements as combined into one single module 10 adaptable to be flexibly installed at almost any manufacturing floor plan and easily re-locatable on the bed of the truck 59, as shown in FIG. 7. Another advantage provides for the ability of the module 10 being integrated into existing buildings and existing machining lines, or being utilized in new facilities.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An integrated system for machining workpieces and separating the chips generated from machining the workpieces comprising;
   a plurality of workstations arranged along a processing path for machining the workpieces,
   a coolant and filtration device extending through said plurality of workstations and adaptable for separating the chips from the workpieces,
   a mist collection device cooperable with said plurality of workstations and said coolant and filtration device for removing mist generated by said plurality of workstations, and
   said plurality of workstations interconnected with said mist collection device and said coolant and filtration device thereby forming a single machining module for processing the workpieces.

2. An integrated system as set forth in claim 1 wherein each of said workstations is configured to perform various machining operations, said workstations having operational interface defined by power supply connectors.

3. An integrated system as set forth in claim 2 including a housing having a plurality of openings defined therein and doors covering at least two of said openings.

4. An integrated system as set forth in claim 3 wherein each of said workstations is detachably disposed in said opening of said housing thereby forming said single machining module.

5. An integrated system as set forth in claim 4 including an interface connection defined in said housing to receive said workstation.

6. An integrated system as set forth in claim 5 wherein said interface connection is further defined by a panel removably disposed in said opening, said panel presenting a connection system to complement with said power supply connectors of said operational interface.

7. An integrated system as set forth in claim 6 including a track connected to said housing and extending along said processing path.

8. An integrated system as set forth in claim 7 including a manipulator slidably movable along said track for engaging the workpiece and processing the workpiece in at least one of said workstations.

9. An integrated system as set forth in claim 8 wherein said manipulator is further defined by a multi-axial robotic device.

10. An integrated system as set forth in claim 9 including a conveyor system for separating the workpieces relative said single machining module.

11. An integrated system as set forth in claim 10 wherein said conveyor system is further defined by a first conveyor extending through said single machining module for delivering pre-machined workpieces to be pick-up by said multi-axial robotic device and moving machined workpieces away from said multi-axial robotic device after machining process is complete.

12. An integrated system as set forth in claim 11 wherein said conveyor system is further defined by a second conveyor extending to said single machining module for moving defective workpieces away from said single machining module.

13. An integrated system for machining workpieces and separating the chips generated from machining the workpieces comprising;
    a plurality of workstations interconnected along a processing path to form a cooperable machining system,
    a processing system extending through said plurality of workstations adaptable for separating the chips from the workpieces and removing mist generated by said plurality of workstations, and
    a manipulator cooperable with said cooperable machining system and movable along said processing path thereby transferring the workpieces relative to said workstations for selectively processing the workpieces at each of said workstations.

14. An integrated system as set forth in claim 13 wherein cooperable single machining system is further defined by a housing having a plurality of openings defined therein and doors covering at least two of said openings.

15. An integrated system as set forth in claim 14 wherein each of said workstations is detachably disposed in said openings of said housing thereby forming said cooperable machining system.

16. An integrated system as set forth in claim 15 wherein each of said workstations perform various machining operations, said workstations having operational interface defined by power supply connectors.

17. An integrated system as set forth in claim 16 wherein said manipulator is further defined by a track connected to said housing and extending along said processing path.

18. An integrated system as set forth in claim 17 wherein said manipulator is further defined by a multi-axial robotic device slidably movable along said track for engaging the workpiece and processing the workpiece in at least one of said workstations.

19. An integrated system as set forth in claim 18 including a conveyor system for separating the workpieces relative said cooperable machining module, said conveyor system including a first conveyor extending through said cooperable machining module for delivering pre-machined workpieces to be pick-up by said multi-axial robotic device and moving machined workpieces away from said multi-axial robotic device after machining process is complete and a second conveyor extending to said cooperable machining module for moving defective workpieces away from said cooperable machining module.

20. An integrated system as set forth in claim 19 wherein said processing system is further defined by a coolant and filtration device extending through said plurality of workstations and adaptable for separating the chips from the workpieces.

21. An integrated system as set forth in claim 19 wherein said processing system is further defined by a mist collection device cooperable with said plurality of workstations and said coolant and filtration device for removing mist generated by said plurality of workstations machining the workpieces.

22. An integrated system as set forth in claim 21 including an interface connection defined in said housing to receive said workstation.

23. An integrated system as set forth in claim 22 wherein said interface connection is further defined by a panel removably disposed in said opening, said panel presenting a connection system to complement with said power supply connectors of said operational interface.

24. An integrated system for machining workpieces and separating the chips generated from machining the workpieces comprising;
    a housing,
    a first workstation and a second workstation interconnected by said housing along a processing path to form a machining module,
    an operational interface defined by each of said first workstation and said second workstation, and
    an interface connection disposed in said housing to interchangeably receive said operational interfaces of said first workstation and said second workstation.

25. An integrated system as set forth in claim 24 wherein said housing includes a plurality of openings defined therein.

26. An integrated system as set forth in claim 25 wherein said interface connection is positioned detachably adjacent one of said openings.

27. An integrated system as set forth in claim 26 wherein said interface connection is further defined by a panel presenting a connection system configured to complement with said operational interfaces of said first workstation and said second workstation.

28. An integrated system as set forth in claim 27 including a manipulator cooperable with said housing and movable along said processing path for selectively processing the workpieces at each of said first and second workstations.

29. An integrated system as set forth in claim 28 wherein said manipulator is further defined by a track connected to said housing and extending along said processing path.

30. An integrated system as set forth in claim 29 wherein said manipulator is further defined by a multi-axial robotic device slidably movable along said track for engaging the workpiece and processing the workpiece in at least one of said first and second workstations.

31. An integrated system as set forth in claim 30 including a conveyor system for separating the workpieces relative said housing, said conveyor system including a first conveyor extending through said housing for delivering pre-machined workpieces to be pick-up by said multi-axial robotic device and moving machined workpieces away from said multi-axial robotic device after machining process is complete and a second conveyor extending to said housing for moving defective workpieces away from said housing.

32. An integrated system as set forth in claim 30 including a coolant and filtration device extending through said housing and adaptable for separating the chips generated from machining the workpieces.

33. An integrated system as set forth in claim 32 including a mist collection device cooperable with said first workstation and said second workstation and said coolant and filtration device for removing mist generated by said first workstation and said second workstation machining the workpieces.

34. An integrated system as set forth in claim 33 wherein each of said first and second workstations is detachably disposed in said housing thereby forming a single machining module.

35. An integrated system for machining workpieces having a pair of workstations interconnected along a processing path and a manipulator cooperable with the workstations providing access the workstations to process the workpieces at each of the workstations, said integrated system comprising:
    a housing having interconnected side walls exposed to an open top for engaging the workstations, said housing presenting at least one door to allow an access into said housing;
    a panel partially enclosing said open top; and
    a locking mechanism interconnected with said housing and said panel to slidably move said panel relative to said housing at said open top for preventing the manipulator from accessing the workstation as the workstation is accessible through said at least one door being opened.

36. An integrated system as set forth in claim 35 wherein said locking mechanism is further defined by a handle having a shoulder for slidably moving along the processing path , said shoulder extending to a gripper overlapping said door as said door is closed.

37. An integrated system as set forth in claim 36 wherein said locking mechanism is further defined by a pair of limiters connected to said housing for controlling slidable movement of said handle relative to said housing.

38. An integrated system for machining workpieces comprising:
    a pair of workstations interconnected along a processing path;
    a manipulator cooperable with said workstations and adaptable to access said workstations;
    a housing having interconnected side walls exposed to an open top for engaging the workstations, said housing presenting at least one door to allow an access into said housing;
    a panel partially enclosing said open top; and
    a locking mechanism interconnected with said housing and said panel to slidably move said panel relative to said housing at said open top thereby preventing said manipulator from accessing said workstations when said door is opened.

39. An integrated system as set forth in claim 38 wherein said locking mechanism is further defined by a handle having a shoulder for slidably moving along the processing path, said shoulder extending to a gripper overlapping said door as said door is closed.

40. An integrated system as set forth in claim 39 wherein said locking mechanism is further defined by a pair of limiters connected to said housing for controlling slidable movement of said handle relative to said housing.

41. An integrated system as set forth in claim 40 including a coolant and filtration device extending through said housing and adaptable for separating the chips from the workpieces.

42. An integrated system as set forth in claim 41 including a mist collection device cooperable with said workstations and said coolant and filtration device for removing mist generated by said workstations machining the workpieces and discharging the mist into said coolant and filtration device.

43. A method of forming a machining module for manufacturing workpieces comprising;
    engaging a plurality of workstations to define a processing path to machine the workpieces,
    cooperably assembling a processing system with the plurality of workstations to form the machining module to circulate the chips from the workpieces and to remove mist generated by the plurality of workstations,
    connecting a manipulator to the machining module to move the workpieces along the processing path to process the workpieces at each of the workstations, and
    moving the machining module to a remote location.

44. A method as set forth in claim 43 wherein the step of connecting a manipulator to the machining module is further defined by connecting a track to the machining module along the processing path.

45. A method as set forth in claim 44 wherein the step of connecting a manipulator to the machining module is further defined by engaging a multi-axial robotic device within the track to slidably move the multi-axial robotic device along the track.

46. A method as set forth in claim 45 wherein the step of engaging a plurality of workstations is further defined by forming a housing having at least one opening defined therein.

47. A method as set forth in claim 46 wherein the step of engaging a plurality of workstations is further defined by detachably disposing the workstations in the at least one opening of the housing.

48. A method as set forth in claim 47 including the step of connecting a conveyor system for separating the workpieces relative the machining module.

49. A method as set forth in claim 48 wherein the step of connecting a conveyor system is further defined by extending a first conveyor through the machining module to deliver pre-machined workpieces to be pick-up by the multi-axial robotic device and to move machined workpieces away from the machining module after machining process is complete.

50. A method as set forth in claim 49 wherein the step of connecting a conveyor is further defined by connecting a second conveyor to the machining module to move defective workpieces away from the machining module.

51. A method as set forth in claim 50 wherein the step of cooperably assembling a processing system is further defined by interconnecting a coolant and filtration device with the plurality of workstations to circulate the chips from the workpieces.

52. A method as set forth in claim 51 wherein the step of cooperably assembling a processing system is further defined by interconnecting a mist collection device with the plurality of workstations and the coolant and filtration device to remove mist generated by the plurality of workstations and to discharge the mist into the coolant and filtration device.

53. A method of forming a machining module for manufacturing workpieces comprising;

engaging a plurality of workstations to define a processing path to machine the workpieces, cooperably assembling a coolant and filtration device with the plurality of workstations to form the machining module to separate the chips generated from machining the workpieces from a coolant and to remove mist generated by the plurality of workstations, connecting a pressurized pump to the coolant and filtration device to circulate the coolant separated from the chips and supplying the coolant to the plurality of workstations, connecting a manipulator to the machining module to move the workpieces along the processing path to process the workpieces at each of the workstations, and moving the single machining module to a remote location.

54. A method as set forth in claim 53 wherein the step of connecting a manipulator to the machining module is further defined by connecting a track to the machining module along the processing path.

55. A method as set forth in claim 54 wherein the step of connecting a manipulator to the machining module is further defined by engaging a multi-axial robotic device within the track to slidably move the multi-axial robotic device along the track.

56. A method as set forth in claim 55 wherein the step of engaging a plurality of workstations is further defined by forming a housing having at least one opening defined therein.

57. A method as set forth in claim 56 wherein the step of engaging a plurality of workstations is further defined by detachably disposing the workstations in the at least one opening of the housing.

58. A method as set forth in claim 57 including the step of connecting a conveyor system for separating the workpieces relative the machining module.

59. A method as set forth in claim 58 wherein the step of connecting a conveyor system is further defined by extending a first conveyor through the machining module to deliver pre-machined workpieces to be pick-up by the multi-axial robotic device and to move machined workpieces away from the machining module after machining process is complete.

60. A method as set forth in claim 59 wherein the step of connecting a conveyor is further defined by connecting a second conveyor to the machining module to move defective workpieces away from the machining module.

61. A method as set forth in claim 60 wherein the step of cooperably assembling a coolant and filtration device is further defined by interconnecting a mist collection device with the plurality of workstations to remove mist generated by the plurality of workstations and to discharge the mist into the coolant and filtration device.

* * * * *